(12) United States Patent
Hobson et al.

(10) Patent No.: US 6,633,653 B1
(45) Date of Patent: Oct. 14, 2003

(54) WATERMARKED DIGITAL IMAGES

(75) Inventors: Paola Marcella Hobson, Basingstoke (GB); Lai Hock Tay, London (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/499,048

(22) Filed: Feb. 4, 2000

(30) Foreign Application Priority Data

Jun. 21, 1999 (GB) ............................................. 9914384

(51) Int. Cl.$^7$ ................................................. G06K 9/00
(52) U.S. Cl. ...................................... 382/100; 382/250
(58) Field of Search ................................. 382/100, 250

(56) References Cited

U.S. PATENT DOCUMENTS

| | | | | |
|---|---|---|---|---|
| 5,930,369 A | * | 7/1999 | Cox et al. ................... | 283/113 |
| 6,285,775 B1 | * | 9/2001 | Wu et al. .................... | 382/100 |

FOREIGN PATENT DOCUMENTS

| | | |
|---|---|---|
| EP | 0 828 372 A2 | 3/1998 |

OTHER PUBLICATIONS

"Secure Spread Spectrum Watermarking for Multimedia" by Ingemar Cox et al. NEC Research Institute Technical Report 95–10 1995.*

"DCT–based Watermark Recovering without Resorting to the Uncorrupted Original Image" by A. Piva et al. IEEE Signal Processing Society 1997 International Conference on Image Processing.*

"Improved robust watermarking through attack characterization" by Deepa Kundur et al. Optics Express 485 1998.*

"Copyright protection of digital images by embedded unperceivable marks" by Mauro Barni et al. 1998.*

Fridrich J: "Robust Bit Extraction from Images"; Proceedings of the International Conference on Multimedia Computing and Systems, Jun. 1999, XP000939253, p. 536, right–hand column, line 35—p. 537, right–hand column, line 42.

Kundur D. et al.: "Attach Characterization for Effective Watermarking"; Kobe, Japan, Oct. 24–28, 1999, Los Alamitos, Ca: IEEE, US, Oct. 1999, pp. 240–244, XP000939230, ISBN: 0–7803–5468–0, p. 242, left–hand column, line 9–line 22.

Ruanaidh JJKO et al.: "Phase Watermarking of Digital Images" Proceedings of the International Conference on Image Processing (ICIP), US, New York, IEEE, Sep. 16, 1996, pp. 239–242, XP000199952, ISBN: 0–7803–3259–8 the whole document.

\* cited by examiner

*Primary Examiner*—Jon Chang
*Assistant Examiner*—Charles Kim
(74) *Attorney, Agent, or Firm*—Steven R. Santema; Valerie M. Davis

(57) ABSTRACT

A tamper detection method for digital images includes: providing a digitally watermarked image; digitally processing at least some watermarked parts of the image to obtain confidence values; and using the confidence values to provide an indication as to the likelihood that the image has been tampered with.

4 Claims, 3 Drawing Sheets

WATERMARKED DIGITAL IMAGES

FIELD OF THE INVENTION

This invention relates to watermarked digital images. In particular, it relates to methods for improving confidence in and for authentication of watermarked digital images.

In order to increase confidence of use of digital images as evidence, possibly in a court of law, there is a significant need to demonstrate that an image has not been tampered with.

BACKGROUND OF THE INVENTION

It is known to use audit trails, in which information about when an image was processed is appended to the image, but these methods are only applicable once an image has been registered onto a system. Such audit trails therefore cannot detect any unauthorized operations prior to registration on a computer, and may not be able to report on the type of processing done at any one time. Audit trails can also be avoided or corrupted, whether deliberately or accidentally.

Image watermarking is a known technique. In this technique, a known binary pattern or signature is embedded into an image at the moment of image acquisition. Such watermarks are called "robust" because they are designed to remain intact regardless of any post-processing of the image such as filtering, cropping etc. While such watermarks do provide a useful degree of protection, they can at present not be wholly relied on and they cannot always possess the required degree of surety that an image has not been tampered with in order for the image to be used as evidence under the strict rules of courts of law, etc.

Ruanaidh, Dowling and Boland "Phase Watermarking of Digital Images", IEEE INTCONF Image Processing, Vol. 3, Lausanne, Switzerland, September 1996, pp 239 to 241, describes a technique for watermarking digital images in which an image is divided into blocks of a selected size (e.g. 16×16 pixels). A discrete Fourier transform (DFT) is applied to the luminance component of the image on a block by block basis. The DFT is a complex value and thereby generates a modulus and a phase. The resulting watermark comprises a binary string of 1's and 0's which may represent, for example, a company logo, a user authentication code, date/time/location information and so on. The watermark is embedded in the image by altering the phase of selected DFT coefficients.

The present invention arose in an attempt to provide an improved method of authenticating, and thereby improve confidence in, a watermarked image.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

According to the present invention there is provided a tamper detection method for digital images, comprising providing a digitally watermarked image; digitally processing at least some watermarked parts of the image to obtain confidence values, and using the confidence values to provide an indication as to the likelihood that the image has been tampered with.

Preferably, a discrete Fourier transform is applied to the image on a block by block basis, and the watermark is applied to each one of a selected number of DFT coefficients within a block by selecting the phase of that DFT coefficient to be equal to the phase of one or other of a plurality of phase values, of a set of quantized phase values, which are closest to the actual phase dependent upon the value with which the watermarked bit is to be embedded, and wherein during recovery of the watermark, a discrete Fourier transform is again taken of each block and the watermark is recovered by determining which of the quantized set of levels the recovered bit phase data is closest to.

A confidence measure for each bit n of recovered phase $P_n$ may be defined as $$C_n = 1 - (2*|P_x - P_n|/|P_x - P_y|)$$

where $P_n$ is the recovered phase for bit n of the watermark, $\|$ denotes modulus, and $P_x$, $P_y$ are the nearest reference phase levels, where $P_x$ was chosen as the closest phase level.

Alternatively, the digital watermarking is done on blocks of the image of a predetermined size; wherein an amplitude value is added to, or from, an amplitude relating to each one of a number of selected pixels of the block, depending upon whether the value with which the watermarked bit is to be embedded, and wherein during recovery of the watermark, an estimate of the actual value is made, and wherein each confidence value is related to how close the recovered amplitude is to one or more of a quantized set of reference amplitude levels. The confidence measure $C_n$ of each bit n may then be defined as $$C_n = 1 - (2*|A_x - A_n|/|A_x - A_y|)$$

wherein An is the recovered amplitude for bit n of the watermark, $\|$ denotes modulus, and $A_x$, $A_y$ are the nearest reference amplitude levels, where $A_x$ was chosen as the closest.

The watermark is preferably a binary code (i.e., the value can be 0 or 1) or may be other codes, in which each bit could be embedded with any of three, four or more values for example. This coding may be useful in the spatial domain but can also be used in the transform domain.

Embodiments of the invention will be described which use phase modulation types of image watermarking. However, it should be appreciated that the concepts of the present invention may be equally applied with other types of image processing, and particularly in the spatial domain in addition to the frequency or phase domain.

Figure 1:
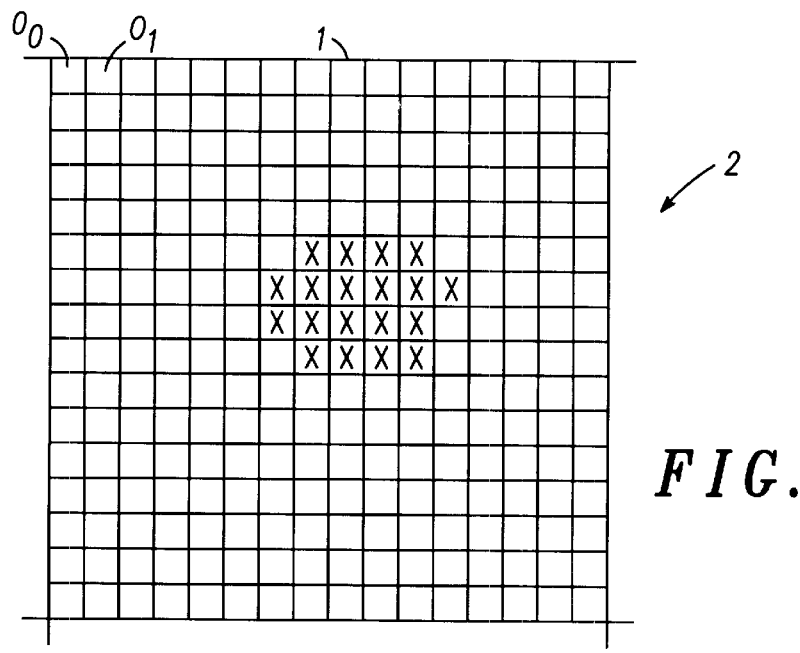
FIG. 1 shows the DFT of a block forming part of an image.
Figure 2:
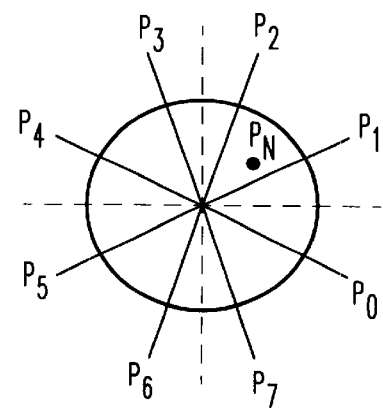
FIG. 2 shows phase quantization levels for forming a watermark.

In a method in line with that used by Ruanaidh et al, an image is divided into blocks of desired size. These may be, for example, 16×16 pixels. A discrete Fourier transform (DFT) is applied to the luminance component of the image on a block by block basis. The DFT generates a modulus and a phase. FIG. 1 shows one 16×16 pixel block 1 forming part of an image 2. The watermark is a binary string of 1's and 0's which may represent possibly a company logo, a user authentication code, some date/time/location information, etc. The watermark is embedded into the block 1 by altering the phase of selected DFT coefficients. The DFT coefficients selected are shown purely schematically as X's in some of the coefficients in block 1 of FIG. 1. In some embodiments, 52 such elements are used (less than these are shown in the figure for clarity). The number 52 is chosen for minimal visibility in the image but other numbers may be used as desired. The phase of the coefficient to be used is quantized to one of a set of values as shown in FIG. 2. Whilst any number of phase levels $P_0$ to $P_n$ may be used, for an appropriate trade off between visibility and ease of recovery, it has been found desirable to use eight phase levels, $P_0$ to $P_7$. The phase of any one particular coefficient $P_n$ will be modified so that it takes on one of the quantized values $\{P_0 \ldots P_7\}$. In order to have a binary code, the scheme is chosen such that if the watermark bit to be embedded is a 1, then the nearest phase from the set of even phases $\{P_0, P_2, P_4, P_6\}$ is chosen to replace the value $P_n$. If the watermark bit to be embedded is a 0, then the nearest set from the set of odd phases $\{P_1, P_3, P_5, P_7\}$ is chosen to replace the value $P_n$.

At the receiving end, in order to recover the watermark, the DFT is taken of each 16×16 block and the phase of the 52 watermarked bits examined. If the recovered phase is closest to one of the set $\{P_0, P_2, P_4, P_6\}$, then a 1 is detected. If the recovered phase is closest to one of the set $\{P_1, P_3, P_5, P_7\}$, then a 0 is detected.

Figure 3:
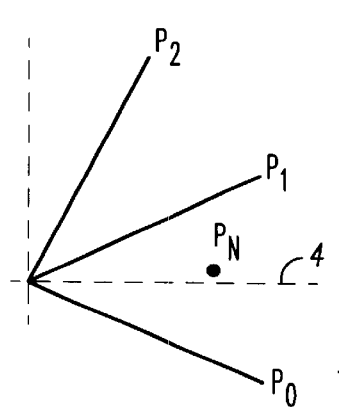
FIG. 3 shows a phase diagram on subsequent stage of verifying the watermark.

After watermarking, the image may undergo a series of legitimate operations such as non-linear filtering, JPEG compression etc, which may alter the phase such that the phase of the received image is no longer that determined by the quantization process of FIG. 2. The receiver must then choose the nearest quantization level. FIG. 3 shows a bit of received phase $P_n$. Note that the figure only shows three of the quantized phase levels for clarity. Clearly, the original phase must have been one of $P_0 \ldots P_7$. Since $P_n$ is closest to $P_1$, then the bit is considered to be a 0.

The detection method outlined with reference to FIG. 3 is based on the assumption that any legitimate intermediate processing will not alter the phase such that it goes beyond the point where it could be correctly recovered. Referring to the figure, this implies that if the phase $P_n$ is significantly altered by intermediate processing such that it falls below the dashed line 4 for example, then a 1 will be detected instead of a 0 because the phase is closer to $P_0$ than $P_1$.

To improve recovery of the watermark, the mark may be repeated in each of the 16×16 blocks of the image. Thus, for a QCIF image (176×144 pixels) there will be up to 99 repeats of the watermark (in practice not all blocks are watermarked to reduce visibility). Thus, an average over all the blocks can be taken to give the recovered watermark. However, information within each received block can be used in order to provide more information about what has happened to that block since the image was watermarked.

In embodiments of the invention, a confidence measure Cn for recovered phase Pn is defined as $$C_n = 1 - (2*|P_x - P_n|/|P_x - P_y|)$$

where $P_n$ is the recovered phase for bit n of the watermark, || denotes modulus, and $P_x$, $P_y$ are the nearest reference phase levels, where $P_x$ was chosen as the closest. In the example shown in FIG. 3, $P_x = P_1$, and $P_y = P_0$.

Thus, if phase $P_n$ was equal to $P_1$, a 0 would be detected as the watermark bit with confidence 1. If it falls midway between $P_0$ and $P_1$ (i.e. on the dashed line 4 of FIG. 3) then one would not know whether it should be a 1 or a 0 so the confidence of decision becomes 0.

Figure 4:
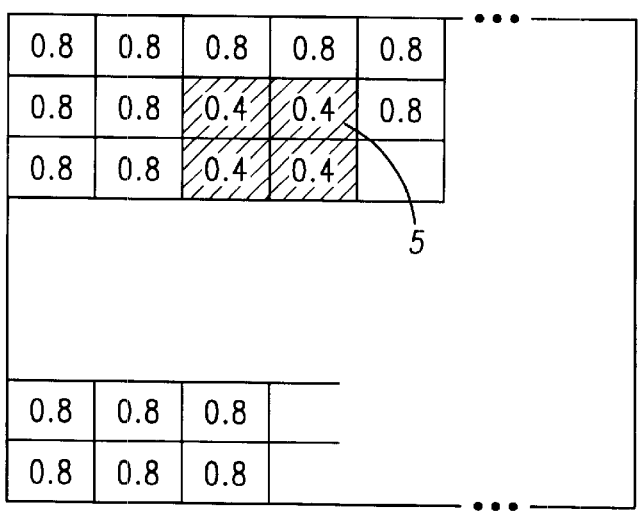
FIG. 4 shows confidence values across part of an image.

Most legitimate processes tend to operate over the whole of an image. Thus, if the confidence measure for bit n of the watermark embedded in 16×16 block K of the image is measured, one would expect it to be the same as for bit n of the watermark embodied in any other 16×16 block of the image. If the confidence measure $C_n$ is the same for bit n in each block, then it is highly unlikely that the image has been tampered with. The possibility that tampering has occurred may be detected, therefore, by examining the confidence measure for bit n across the whole image and in FIG. 4 the confidence measure for some bits n are shown. In the figure, the confidence of recovery of bit n of the watermark is found to be about 0.8 for most of the pixels in the image (only a few have been shown), but a small area 5, which is shown hatched, shows a confidence of 0.4. The user may therefore suspect that an operation was performed in this area which was not carried out on the rest of the picture. Examples of such tampering which would impact confidence are cutting and pasting where the inserted area may or may not have its own watermark embedded, frequency domain filtering using off-the-shelf image manipulation packages and other types of processing.

Accordingly, suspicion would be thrown upon this particular image and upon its authenticity.

An alternative method is to compute the confidence per block as an average across the whole watermark and to compare this with the average confidence measure in each of the other blocks throughout the image. A significant difference in the confidence measure for a block compared with the rest of the image might indicate tampering. This variation tends to overcome problems which may occur with a localized change to the confidence measure of one bit of the watermark within a block due to random noise or other random effects.

It is described above how in some embodiments not all blocks of the image may be watermarked. When determining the confidence of the image, one would expect those areas which have been watermarked to have a higher confidence measure and therefore higher confidence level, than those which have not been watermarked. Thus, in a modification and to improve security, only selected area are watermarked and the receiving party needs to be made aware which areas those are. This can be done by a key method. Since the receiver then knows those areas of the image which are watermarked, he will expect to see higher confidence measures in those area. This represents an additional level of security since a "hacker" may know that watermarks and confidence levels are being detected, but will then be unlikely to know which particular blocks he should concentrate on.

It is possible to combine the methods of the present invention with a bit error rate (BER) measurement of the recovered watermark per block, with respect to the original watermark (if known), for example. By using a BER alongside the confidence measure, security and confidence can be increased. A BER can be used on its own, but fails to detect certain types of tampering.

When the invention is used in the spatial domain, then amplitudes may be used instead of phases by adding to, or subtracting from the luminance value of selected pixels, an amplitude value (e.g. 2) depending on whether the bit is to be a 1 or 0 (i.e. adding a value if it is to be 1, subtracting if it is to be 0). At recovery, an estimate of the original value is made and then a confidence measurement is made by determining how close the actual value is to be either of the two values expected. So, if the recovered value An lies between expected values $A_x$ and $A_y$, but closer to $A_x$ than the confidence measure is defined as follows:

$$C_n = 1 - (2*|A_x - A_n|/|A_x - A_y|)$$

Note that instead of a binary code, a different code may be embedded as a watermark in some embodiments, both in the spatial and transform domains.

It is described above how a hacker may know that, for example, 16×16 blocks are being watermarked. A further measure, which can be used to improve security, is to change the origin of each block. Referring back to FIG. 1, the block 1 has its origin, i.e. start point at pixel $O_0$. The first block would then normally be the top left-most block of the image, for example. In an origin changing technique, the origin from which each block is then subsequently measured is offset. For example, pixel $O_1$ may be used as the origin. This will offset the block by one pixel. The hacker than needs to know not only the size of the blocks but also the origin point of each block and again this improves security. Clearly, the information regarding the offset of the origin will need to be given to the receiver but this could again be done by a key system.

The techniques outlined above are very efficient at improving the confidence in watermarked images. However, watermarks are often themselves distorted and/or may become impossible to recover when an image undergoes some sorts of legitimate processing such a JPEG compression and decompression.

The confidence measure of the present invention may be used to detect tampering if it is examined over each block in the image. In order to do this, the confidence measure for bit n in a given block is compared with the measure for bit n of the watermark in all other blocks of the values. Anomalous values can be evidence of tampering. However, the confidence measure itself may be subject to variation within a block due to the impact of JPEG processing. JPEG processing is achieved, as is known, by quantization of the DCT (Discrete Cosine Transform) coefficients of an image, which thus impact the phase. The DCT blocks in JPEG are of 8×8 pixels and so there are four 8×8 blocks in a 16×16 block. JPEG quantization is not constant throughout each 8×8 pixel block but is defined according to a quantization table. Quantization becomes increasingly coarse as the coefficients go up in frequency since the eye is less sensitive to high frequency components.

Figure 5:
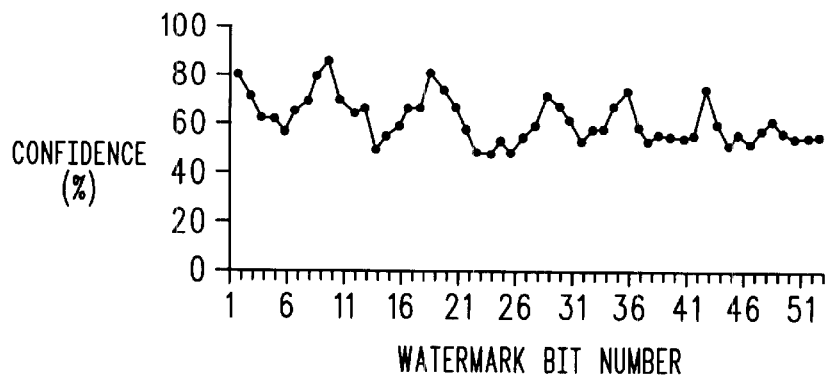
FIG. 5 shows variations in confidence value depending upon the bit position.

An example of the impact of JPEG processing on a 52 bit watermark is shown in FIG. 5 where the confidence level as a percentage is plotted against the watermark bit number. It is seen from the figure that the confidence measure varies within the watermark depending upon the position of the bit. A cyclic pattern is noted having approximately regular peaks and troughs whose periodicity depends on the relationship between the embedding pattern (and the block size used for watermarking) and the JPEG quantization which is based on 8×8 pixel blocks.

In modifications of the invention, a simple method to improve the confidence of recovery of the watermark without destroying its fragility (which is essential for tamper evidence) is to shuffle the embedding of the mark in each block. This may be done in one embodiment by repeating the watermark in each block but rotated one bit at a time, as shown in the following Table 1.

TABLE 1

| Block | Start bit | | | ... | | End bit |
|---|---|---|---|---|---|---|
| 0 | 0 | 1 | 2 | ... | 50 | 51 |
| 1 | 1 | 2 | 3 | ... | 51 | 0 |
| ... | | | | | | |
| 99 | 47 | 48 | 49 | ... | 45 | 46 |

It will be appreciated that many other methods of shuffling may be used. The watermark may be rotated by more than one bit at a time, it may be shuffled between blocks in a pseudo random manner or by many other patterns and schemes as will be appreciated.

The effect of this rotation or shuffling is that the overall confidence of recovery of the watermark is now consistent on the average (i.e. taking all watermarked blocks within the image) for each of the 52 bits. In addition, the essential property that confidence for a given bit position within a 16×16 block can be examined with reference to the complete image has been preserved and thus the watermark can be made more robust (that is more reliably detected) without affecting its tamper evident properties.

It should be noted that the above method does not depend on any particular periodicity in the confidence measure with respect to watermark bit number as this may change if the watermark bits are reordered within the image block in which they are embedded.

Again, the modification as shown with reference to Table 1 is equally applicable in both spatial and transformed domain watermark systems. It is particularly applicable where the original image and/or original watermark may not be available at the receiver when detection of the watermark takes place.

Watermarking in itself can have a visible effect on the image. It is important to choose carefully those parts (i.e. blocks) of the image which are to be watermarked. If the watermark is too visible, then it is easy for a hacker to reproduce the watermark. Accordingly, in order to be successful, a watermarking and confidence measuring scheme requires blocks to be watermarked which can have a high confidence measure and also low visibility.

It is generally prudent not to watermark areas of an image which are of low texture.

Figure 6:
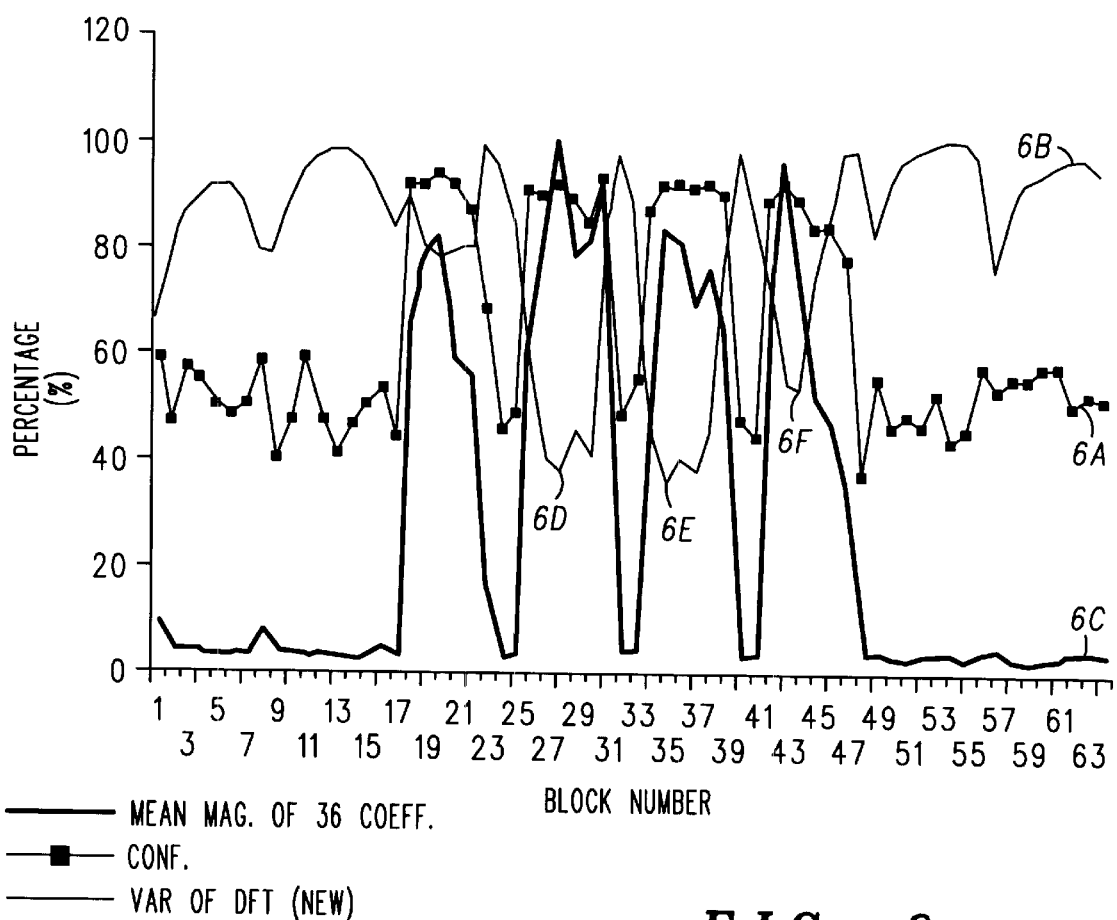
FIG. 6 is a plot of confidence values and DFT magnitude variance values.

For watermarking schemes in the frequency transform domain in particular, but also for use in the spatial domain, the inventors have found that interesting information can be obtained by a study of the variance of the magnitude of the digital Fourier transform. FIG. 6 shows three plots. A first plot 6a is of the confidence level for some of the blocks in a particular image. The confidence measurements are shown as squares and these are joined together to form a plot. Overlaid upon this is a further plot 6b which shows the variance of the magnitude of the DFT coefficients of each block. An additional plot 6c shows the mean magnitude of the DFT coefficients of the blocks which were selected for watermarking with respect to the mean magnitude of all the DFT coefficients of the block.

The variance levels of FIG. 6b are taken as percentages relevant to the figure having the highest variance, which is considered to be 100%.

It is seen that the highest confidence levels are generally obtained for those parts having lower variance (e.g. blocks 6d, 6e, 6f). Accordingly, for the best results, it is preferable to choose to watermark those parts of the image which have a relatively low variance. In some embodiment this may be, for example, those parts of the image which have a variance of less than about 50%. If a block has a variance of less than 50% then this is considered to be a good candidate for watermarking since this block will then have low visibility and high confidence.

It is found that patterns similar to that of FIG. 6 are obtained with most images.

Table 2 below shows the effects of watermarking three different images, respectively called "house", "rose" and "beans", and of watermarking those parts of the image which have a variance in magnitude of DFT of less than 50%. The overall confidence varies from 75.5 to 89.78% and the visibility of the watermarks is good (i.e. this means that the watermarks are not particularly visible).

TABLE 2

| Test Image | No. of blocks w/marked | Overall BER (%) | Overall Confidence (%) | Avg. PSNR (dB) | Visibility of w/mark |
|---|---|---|---|---|---|
| House | 35 | 3.81 | 80.2 | 83.23 | Good |
| Rose | 60 | 6.99 | 75.5 | 78.5 | Good |
| Beans | 9 | 0.31 | 89.78 | 87.5 | Good |

In each of the images, a total of 64 blocks were available to watermark and only some of these were chosen to be watermarked, depending upon whether they had the correct variance.

Table 3 below indicates the results of a second scheme for the same three images in which a block was watermarked if the mean magnitude of the 36 DFT coefficients which were chosen for watermarking was greater than 40% (that is 40% of the total mean magnitude for the DFT block). It is seen that although the confidence overall is increased, the visibility of the watermarks is not as good as for those chosen only when the variance is less than 50%.

TABLE 3

| Test Image | No. of blocks w/marked | Overall BER (%) | Overall Confidence (%) | Avg. PSNR (dB) | Visibility of w/mark |
|---|---|---|---|---|---|
| House | 29 | 0.57 | 88.1 | 83.16 | Not as Good as A |
| Rose | 33 | 3.68 | 80.1 | 75.0 | As Good as A |
| Beans | 22 | 0.25 | 89.82 | 84.4 | Not as Good as A |

Table 4 below indicates a scheme in which a block was chosen to be watermarked only if both the conditions of Table 2 and 3 were satisfied, that is if the variance of the magnitude of the DFT was less than 50% with respect to peak variance and the mean magnitude of 36 coefficients chosen to watermark was greater than 40% of the total mean magnitude.

TABLE 4

| Test Image | No. of blocks w/marked | Overall BER (%) | Overall Confidence (%) | Avg. PSNR (dB) | Visibility of w/mark |
|---|---|---|---|---|---|
| House | 17 | 0.49 | 88.6 | 85.3 | As Good as A |
| Rose | 30 | 3.85 | 81.1 | 79.5 | A is slightly better |
| Beans | 9 | 0.31 | 89.8 | 87.5 | As Good as A |

It is seen that the overall confidence levels are high and also that the visibility of the watermarks is good.

Note that only a small number of blocks met the requirements for this table. By using origin offsetting it may be possible to change the origin so that more blocks are suitable, and thereby maximize the number of blocks which have the preferred characteristics for watermarking.

Figure 7:
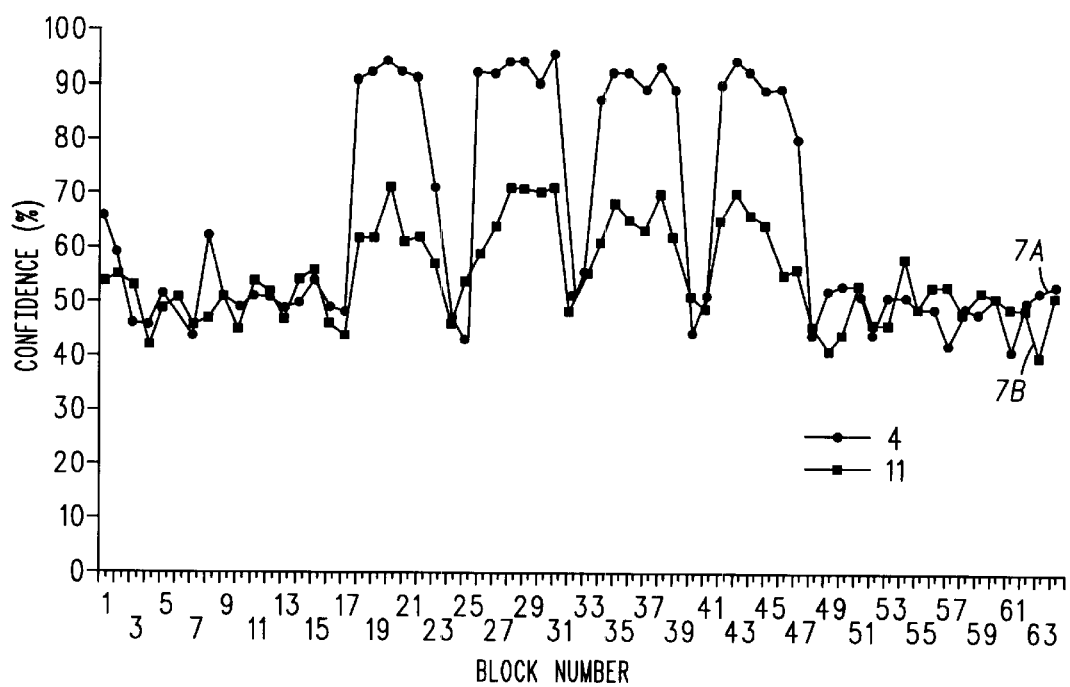
FIG. 7 is a plot of confidence values for different JPEG compression regimes.

Referring back to watermarking images which are then subject to JPEG compression, FIG. 7 shows two plots 7a and 7b of varying degrees of JPEG compression. 7a shows the confidence in blocks which have been subject to a 4:1 compression whereas block 7b shows ones which have been subject to an 11:1 compression. As shown, the peaks and troughs in the confidence measure are generally in line, but the greater compression tends to reduce the amplitudes of the peaks and troughs. Thus, confidence measures can work over a great variation of images and image compression techniques. Confidence values change in predictable ways for legitimate processing.

Figure 8:
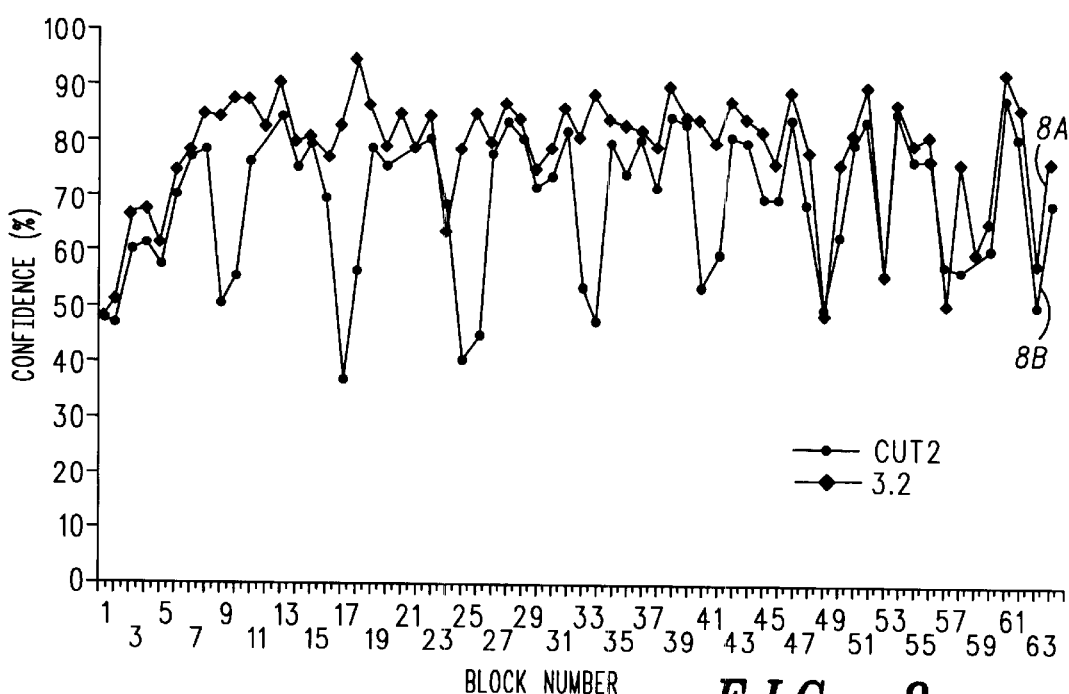
FIG. 8 shows the effect on confidence of cutting and pasting part of an image.

FIG. 8 shows the changes in confidence level which occurred when an image was deliberately tampered with, in this case by cutting and pasting certain blocks and parts of the image. Plot 8a indicates the confidence levels per block and plot 8b shows which blocks were tampered with by cutting and pasting. A correlation is observed and the user can determine that the image may have been tampered and may therefore be unreliable as evidence.

What is claimed is:

1. A tamper detection method for digital images comprising:
   providing a digitally watermarked image;
   digitally processing at least some watermarked parts of the image to obtain confidence values; and
   using the confidence values to provide an indication as to the likelihood that the image has been tampered with, wherein the digital watermarking is made on blocks of the image of a predetermined size, a discrete Fourier transform (DFT) is applied to the image on a block by block basis to generate a plurality of DFT coefficients, and a watermark is applied to each one of a selected number of DFT coefficients within a block by selecting the phase of that DFT coefficient to be equal to the phase of one or other of a plurality of phase values, of a set of quantized phase values, which are closest to the actual phase, dependent upon the value with which the watermarked bit is to be embedded, and
   wherein during recovery of the watermark, a discrete Fourier transform is again taken of each block and the watermark is recovered by determining which of the quantized set of levels the recovered bit phase data is closest to, wherein each confidence value is related to the proximity of the recovered phase to one or more of the quantized set of phase levels.

2. The method as claimed in claim 1, wherein the watermark is represented by a binary code.

3. The method as claimed in claim 1, wherein a confidence measure for each bit n of recovered phase $P_n$ is defined as $$C_n = 1 - (2 * |P_x - P_n| / |P_x - P_y|)$$

where $P_n$ is the recovered phase for bit n of the watermark, $\|$ denotes modulus, and $P_x$, $P_y$ are the nearest reference phase levels, where $P_x$ was chosen as the closest.

4. A tamper detection method for digital images comprising:
   providing a digitally watermarked image;
   digitally processing at least some watermarked parts of the image to obtain confidence values; and using the confidence values to provide an indication as to the likelihood that the image has been tampered with, wherein the digital watermarking is done on blocks of the image of a predetermined size, wherein an amplitude value is added to, or subtracted from, an amplitude relating to each one of a number of selected pixels of the block, depending upon whether the value with which the watermarked bit is to be embedded, and wherein during recovery of the watermark, an estimate of the actual amplitude value is made, and wherein each confidence value is related to the proximity of the recovered amplitude to one or more of a quantized set of reference amplitude levels, and wherein a confidence measure for each bit is of recovered amplitude $A_n$ is defined as:

$$C_n = 1 - (2*|A_x - A_n|/|A_x - A_y|)$$

where $A_n$ is the recovered amplitude for bit n of the watermark, $\|$ denotes modules, and $A_x$, $A_y$ are the nearest reference amplitude levels, where $A_x$ was chosen as the closest.

* * * * *